United States Patent
d'Escragnolle et al.

(10) Patent No.: US 9,712,678 B1
(45) Date of Patent: *Jul. 18, 2017

(54) METHODS SYSTEMS AND COMPUTER PROGRAM PRODUCTS FOR MANAGING ACCESS TO CUSTOMER DATA

(71) Applicant: INTUIT INC., Mountain View, CA (US)

(72) Inventors: Alan de Robert d'Escragnolle, San Francisco, CA (US); Marko S. Rukonic, San Jose, CA (US); Eugene Krivopaltsev, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,639

(22) Filed: Aug. 8, 2016

Related U.S. Application Data

(63) Continuation of application No. 13/663,367, filed on Oct. 29, 2012, now Pat. No. 9,412,103.

(51) Int. Cl.
  *H04M 3/523* (2006.01)
  *G06Q 30/00* (2012.01)
  *H04W 12/06* (2009.01)

(52) U.S. Cl.
  CPC ........ *H04M 3/5232* (2013.01); *G06Q 30/016* (2013.01); *H04W 12/06* (2013.01)

(58) Field of Classification Search
  CPC ... H04M 3/5232; H04W 12/06; G06Q 30/016
  See application file for complete search history.

(56) References Cited

U.S. PATENT DOCUMENTS

| 9,088,656 | B2* | 7/2015 | Mezhibovsky | ......... H04M 3/51 |
| 9,531,878 | B2* | 12/2016 | Mezhibovsky | ......... H04M 3/51 |
| 9,578,172 | B2* | 2/2017 | Booij | ...................... H04M 3/51 |
| 2005/0226250 | A1 | 10/2005 | Makayama et al. | |

(Continued)

OTHER PUBLICATIONS https://www.google.com/search?q=SYSTEMS+AND+COMPUTER+PROGRAM+PROD.., printed: May 18, 2014 (2pages).

(Continued)

*Primary Examiner* — Kambiz Zand
*Assistant Examiner* — Abiy Getachew
(74) *Attorney, Agent, or Firm* — Vista IP Law Group LLP

(57) ABSTRACT

Controlling access to customer data. A customer service agent is provided with indirect access to customer data through an intermediate computer such that it is not necessary for the customer service agent to ask questions about the received customer data or receive such data from the customer directly. Secure data access can be used to validate customers and streamline customer interaction and discussions with customer service agents since many questions a customer service agent may ask a customer directly during a discussion are already answered and known to the customer service agent before the customer speaks with the customer service agent. The customer can select which merchants receive customer data, and customer data can be entered manually or acquired by processing images of customer documents or cards such as personal identification or account cards containing information to be used during customer service discussions.

20 Claims, 16 Drawing Sheets

(56) References Cited

U.S. PATENT DOCUMENTS

| | | | |
|---|---|---|---|
| 2006/0188086 A1 | 8/2006 | Busey et al. | |
| 2007/0186184 A1 | 8/2007 | Berstis et al. | |
| 2009/0129678 A1 | 5/2009 | Sukeda et al. | |
| 2009/0265762 A1 | 10/2009 | Evanitsky | |
| 2010/0050241 A1 | 2/2010 | Yan et al. | |
| 2010/0323729 A1 | 12/2010 | Chitsey et al. | |
| 2011/0093949 A1 | 4/2011 | Macrae | |
| 2012/0266258 A1* | 10/2012 | Tuchman | H04L 63/104 726/28 |
| 2013/0325726 A1* | 12/2013 | Tuchman | H04L 63/104 705/304 |
| 2014/0074714 A1 | 3/2014 | Melone et al. | |
| 2014/0162611 A1* | 6/2014 | Mezhibovsky | H04M 3/51 455/414.1 |
| 2017/0105237 A1* | 4/2017 | Qian | H04W 76/021 |

OTHER PUBLICATIONS https://www.google.com/?tbm=pts&gws_rd=ssl, printed: Jul. 15, 2015 (2pages).

https://www.google.com/?tbm=pts&gws_rd=ssl, printed: Apr. 1, 2016 (2pages).

* cited by examiner

| Merchant 135 | Profile 535 |
|---|---|
| Merchant 1 | Name; Shipping Address; Billing Address; Social Security Number; Account Number |
| Merchant 2 | Name; Account Number |
| Merchant 3 | Social Security Number; Account Number |
| Merchant 4 | Social Security Number; Security Question; Security Password |

FIG. 12

METHODS SYSTEMS AND COMPUTER PROGRAM PRODUCTS FOR MANAGING ACCESS TO CUSTOMER DATA

CROSS-REFERENCE TO RELATED APPLICATION

This application is a continuation of co-pending U.S. application Ser. No. 13/663,367, filed on Oct. 29, 2012, entitled METHODS SYSTEMS AND COMPUTER PROGRAM PRODUCTS FOR MANAGING ACCESS TO CUSTOMER DATA, issued as U.S. Pat. No. 9,412,103 on Aug. 9, 2016, priority of which is claimed under 35 U.S.C. §120, and the contents of which are incorporated herein by reference as though set forth in full.

SUMMARY

Embodiments relate to managing customer data and access to customer data by a merchant by, for example, placing restrictions on how and when customer data can be accessed by a customer service agent of the merchant.

Certain embodiments are directed to providing a customer or end user with the ability to control which customer data will be presented to a customer service agent and how and when such data will be presented to or accessed by a customer service agent.

Certain embodiments are directed to allowing a customer or end user with the ability to select which customer data will be presented to a customer service agent, initiate a call or communication to a customer service agent, and request that the customer service agent be provided access to customer data. This may be done using the same computing device.

Certain other embodiments involve methods performed by a computing device of a customer, such as a computer, tablet or mobile communication device, methods performed by a host or intermediate computing device, and methods performed by a customer service agent or merchant computing device.

Methods may involve steps performed by one or more or all of the customer, intermediate and agent computing devices, and one or more or all of the customer, host and customer service agent such as by the customer and host, the customer and merchant, the host and merchant and the customer, host and merchant.

One embodiment is directed to a method performed by a host or intermediate computing device in communication with a computing device of a customer and a computing device of a merchant or customer service agent of the merchant through respective networks, for providing the customer service agent with access to customer data. The method comprises the intermediate computing device storing customer data, e.g., from a customer's mobile communication device, and receiving a request for stored customer data during a communication involving the customer and the customer service agent (e.g., in one embodiment, during navigation of the merchant's interactive voice response menu by the customer, before the customer speaks with the customer service agent). The method further comprises the intermediate computing device providing the customer service agent's computing device with access to the customer's data managed by the intermediate computing device in response to the request, during the communication, after which the customer and customer service agent can speak with each other.

In other embodiments, the customer service agent is not presented with or provided access to any customer data, or only limited or certain types of customer data. For example, the intermediate computing device may validate or confirm that the customer is a customer of the merchant such that it is appropriate for the customer to request customer service.

A further embodiment is directed to a method performed by a computing device of or utilized by a customer, such as a computer, tablet or mobile communication device or application or program executing on the computing device. The method comprises preparing for or facilitating a communication involving the customer and a customer service agent of a merchant. The method comprises receiving data of the customer and receiving an identification of the merchant, which may be selected or entered by the customer. The method further comprises the computing device transmitting the customer data and identification of the merchant to an intermediate computing device of a third party host. The intermediate computing device is also in communication with a computing device of the merchant or customer service agent of the merchant. Thus, when the intermediate computing device receives a request for stored customer data during the communication involving the customer and the customer service agent (but before the customer actually speaks with the customer service agent), the customer service agent's computing device is provided with access to the customer's data via the intermediate computing device, without the customer having to provide that data to the customer service agent during a live communication when the customer, for example, speaks with the customer service agent at a later time.

Yet another embodiment is performed by a computing device of the merchant or customer service agent of the merchant for accessing customer data indirectly from the customer during a communication involving the customer and a customer service agent of the merchant assisting the customer, before the customer speaks with the customer service agent. The method comprises the customer service agent's computing device receiving customer identification data during the communication (but before the customer actually speaks with the customer service agent) and transmitting a request (including the identification data) to the intermediate computing device managed by a host other than the merchant for access to stored customer data. The method further comprises accessing customer data managed by the intermediate computing device and associated the identification data.

A further embodiment is directed to user navigation or interaction with an application executing on a mobile communication device or other computing device of the customer to enter or import customer data (e.g., manual entry, scan or mage and character recognition as necessary), and transmitting customer data to the intermediate computing device. The same mobile communication device may be used to call or contact the customer service agent, which uses identification data such as a telephone number or electronic mail address to request customer data from the intermediate computing device.

Further embodiments are directed to user interfaces generated by an application or program executing on a computing device of the customer or merchant. For example, one embodiment is directed to a user interface generated by an application executing on a mobile communication of the customer. The user interface allows the customer to enter, import or acquire customer data. The user interface also allows the customer to identify or select merchants to which customer data should be provided. The user interface may also allow the customer to enter a note or message for the customer service agent, e.g., specifying why the customer is contacting the merchant. The user interface may also allow the customer to initiate a communication with the merchant, and allow the customer to control when the customer data is sent to the intermediate computer and to the customer service agent (before a communication with the customer service agent, or during navigation of a call menu before the customer speaks with the customer service agent).

Other embodiments are directed to articles of manufacture or computer program products comprising a non-transitory computer readable storage medium embodying one or more instructions executable by a computing device to perform method embodiments involving acquisition of customer data, controlling access to customer data, and requesting customer data. Such computer program products may execute on or be accessed by the customer's computing device, the intermediate computing device and/or the merchant's or customer service agent's computing device.

Yet additional embodiments are directed to systems configured to allow a customer enter, import or acquire customer data, transmit customer data for storage or management by the intermediate computing device, and to provide a customer service agent's computing device with access to the customer's data managed by the intermediate computing device. System embodiments may involve one or more or all of a customer's computing device such as a mobile communication device, the intermediate computing device, and the merchant computing device. The intermediate computing device is managed and controlled by a host other than the merchant or customer service agent such that the intermediate computing device serves to control various parameters of access to customer data, such as which data is made available, and how and when the customer service agent can access customer data.

In a single or multiple embodiments, the intermediate computing device receives customer data from a mobile communication device, receives a request for stored customer data from the merchant's or customer service agent's computing device, and provides the customer service agent's computing device with access to the requested customer data. The intermediate computing device may store data of multiple customers, which is requested by a particular customer service agent computing device, or store data of multiple customers requested by various customer service agent computing devices. Thus, the intermediate computing device may serve one or multiple customers and/or one or multiple merchants.

In a single or multiple embodiments, the intermediate computing device provides managed or restricted access to customer data based at least in part upon customer identification data received from the customer service agent's computing device. For example, a customer may begin a call to a customer service agent, and that telephone number is transmitted to the customer service agent's computing device and submitted by the customer service agent's computing device to the intermediate computing device to request access to customer data associated with that telephone number. Depending on the computing devices and communication protocols employed, the identification data may also be an electronic mail address utilized by the customer to contact the customer service agent or an Internet Protocol (IP) address of the customer's computing device utilized during an on-line communication with the customer service agent's computing device.

In a single or multiple embodiments, the intermediate computing device provides the customer service agent's computing device with access to the customer's stored data such that the customer service agent does not have to request stored data from the customer verbally during a live conversation. The access granted is limited or restricted. For example, the intermediate computing device may allow the customer service agent's computing device to access customer data on a read only basis and/or to only view customer data for a limited time. For example, the customer service agent may be able to view customer data only for the duration of a call by the customer, but when the call terminates, so does the customer service agent's access to the customer data. As another example, the duration of access can be for a pre-determined time, e.g., starting when the customer speaks with the customer service agent, or selected by the customer. The customer, through the user interface of displayed by the customer's computing device, can also control or initiate when the customer service agent's computing device receives or is allowed to access the customer's data.

In a single or multiple embodiments, the user manually enters data, e.g., data of an account or membership card, business card, or personal information or information within an authentication document of the customer such as a driver's license or social security card. Authentication data may also be in the form of biometric data such as a voice sample or photograph of the customer. The customer may also utilize a camera or other image capture element of the computing device to acquire an image or photograph. Customer data in the form of the photograph, or resulting text or other data from a text recognition process, is transmitted to the intermediate computing device. Customer data entry, acquisition and any processing may be performed prior to the customer initiating communication with the customer service agent, or while the customer is navigating a menu (such as a menu displayed on a screen of the mobile communication device or a call menu of the merchant). Thus, the customer service agent may be provided access to customer data while the customer is navigating a call menu or shortly before the customer speaks with the customer service agent.

In a single or multiple embodiments, in addition to customer data, the customer may provide other input such as a note or message, which may be created through the customer's computing device. The note or message may, for example, specify a reason why the customer is calling the merchant or customer service agent. The note or message is transmitted with the customer data to the intermediate computing device and accessed by the customer service agent's computing device.

In a single or multiple embodiments, the intermediate computing device receives customer data or a customer profile including customer data and selected merchant(s). The intermediate computing device may also receive merchant profiles indicating what types of customer data would be required or useful to customer service agents. Based on the received customer profile, and the merchant profile, the intermediate computing device can generate a document or database or table entry (generally, document) including customer data within the customer profile and identified in the merchant profile. Thus, since different customer data may be pertinent to different merchants (e.g., for a bank, credit card company and utility company), some or all of the data in a customer profile may be used to generate a document based at least in part upon a merchant profile.

In a single or multiple embodiments, a password or authentication data is required before the customer service agent is permitted to access customer data. For example, the customer may call customer service, the customer service agent's computing device uses the phone number to request customer data from the intermediate computing device, which informs the customer service agent's computing device that a password is required. The customer service agent's computing device then requests the password from the consumer. The consumer provides the password to the customer service agent's computing device, which then transmits the password to the intermediate computing device. The intermediate computing device compares the received password and stored password, or password received from the customer, provides the customer service agent computing device with access to the customer data if the passwords match. Other embodiments may involve having the customer service agent call the customer back after accessing customer data and performing any required validation or confirmation analysis.

BRIEF DESCRIPTION OF THE DRAWINGS

The foregoing and other aspects of embodiments are described in further detail with reference to the accompanying drawings, wherein:

FIG. 12 is a table illustrating how different merchant profiles;

DETAILED DESCRIPTION OF ILLUSTRATED EMBODIMENTS

Embodiments related to systems and methods for managing data of customers or end users (generally, customers) and access to customer data by a merchant or customer service agent (CSA) or representative of the merchant (generally, "CSA" or "agent") from which the customer purchased a product, at which the customer has an account or is a member, or has some other relationship, which may be a current or existing relationship, or the customer is engaging in a new relationship or new customer service request.

Figure 1:
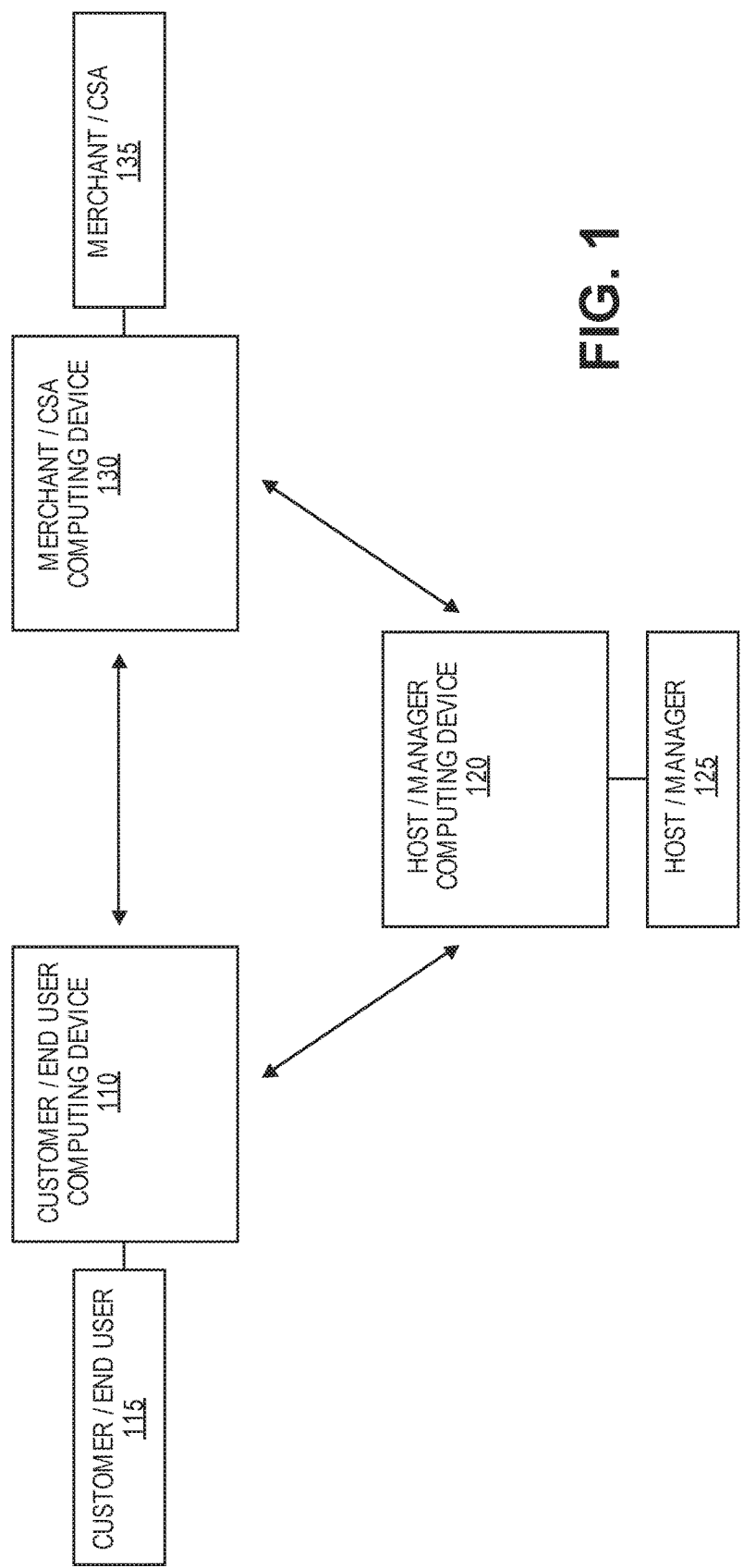
FIG. 1 is a diagram illustrating system components and communications for implementing a method for managing access to customer data through an intermediate computer.

Referring to FIG. 1, in one system embodiment, a computing device 110 of an end user, consumer or customer 115 (generally, "customer") is in communication with an intermediate computer 120 of a third party host or manager 125 (generally, "host," which is not the agent or merchant 135) and a computing device 130 of the customer service agent ("CSA" in FIG. 1) of the merchant 135. For ease of explanation, reference is made to CSA 135 or a CSA computer 130, although it will be understood that a CSA 135 is providing customer service for a merchant to assist customers 115 of the merchant. Accordingly, reference number "135" may refer to the merchant, a CSA of or associated with the merchant.

The customer 115 executes a program, such as an application executing on the mobile communication device 110, to enter or acquire customer data. Customer data may, for example, be in the form of account, bill, business card, membership, personal and/or authentication data. Thus, customer data may be account data, data that is not related to account data such as authentication data, one example of which is a personal identification document, or a combination thereof. Customer data is uploaded by the customer 115 to the intermediate computer 120, which stores customer data and manages how CSAs 135 access the customer's data, e.g., before or during a communication involving the customer 115 and CSA 135, but before a live communication between the customer 115 and CSA 135.

Embodiments eliminate the need for customers 115 to track, remember and re-enter or repeat their customer data, while facilitating introduction and validation of the customer to a CSA 135 provided with managed, restricted or limited access to customer data (e.g., (e.g., read only access or time restricted access), before even speaking or communicating with the customer 115. In this manner, embodiments reduce customer service wait times and live interaction traditionally needed for customer service inquiries, particularly with regard to customer data involving introductory or general matters that are not pertinent to the particular reason for the customer's inquiry. This is done while providing a more personalized, contextual and efficient customer service experience, while enhancing customer service, data security and brand image, while reducing customer service times and costs.

Figure 2:
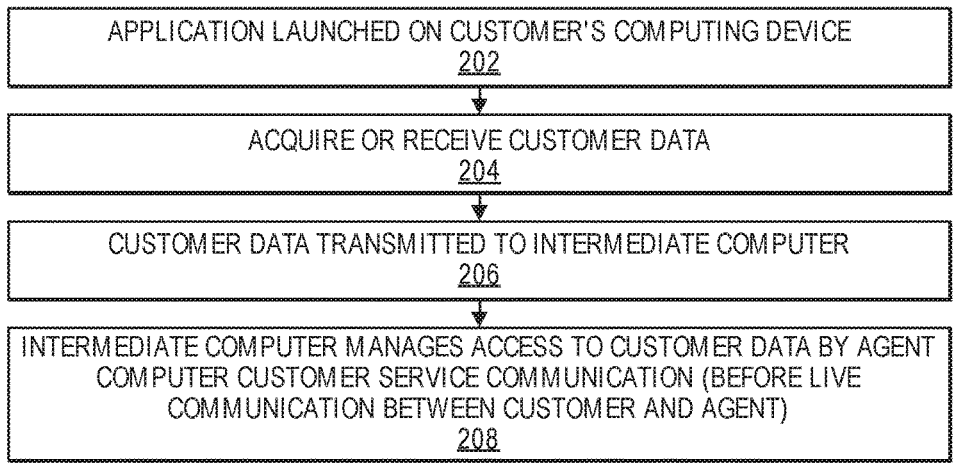
FIG. 2 is a flow diagram illustrating one embodiment of a method for acquiring and transmitting customer data to the intermediate computer for use in managing access to customer data.

With continuing reference to FIG. 1, and with further reference to FIG. 2, in an embodiment of a method performed from the perspective of, or involving, the customer 115 or customer's computing device 110, at 202, an application or program is launched on the customer's computing device 110, one example of which is a mobile communication device. At 204, customer data is acquired or received at or using the customer's computing device 110. At 206, customer data is transmitted from the mobile communication device 110 to the intermediate computer 120 for storage. The intermediate computer 120 then manages access to stored customer data by the CSA 135 before and/or during a live customer service communication (e.g., live conversation). For ease of explanation, and to illustrate one manner in which embodiments may be implemented, reference is made to a mobile communication device 110, intermediate computer 120 and CSA computer 130, although as discussed in further detail below, it will be understood that embodiments may involve various types of computing devices.

Figure 3:
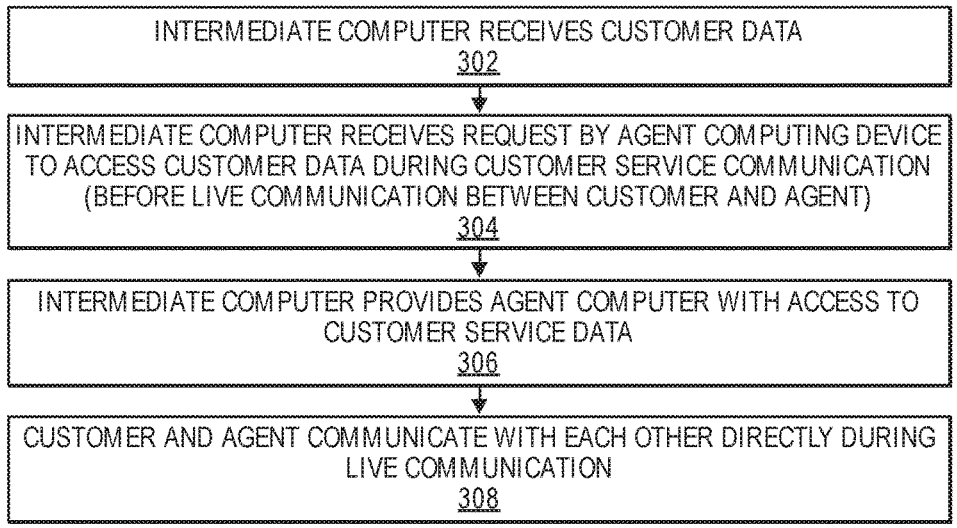
FIG. 3 is a flow diagram illustrating one embodiment of a method for receiving and managing access to customer data.

With continuing reference to FIG. 1, and with further reference to FIG. 3, in an embodiment of a method performed from the perspective of, or involving, the host 125 or intermediate computer 120, customer data is received from the customer's mobile communication device 110 and stored at 302. At 304, the intermediate computer 120 receives a request from the CSA's computer 130 to access customer data, e.g., following customer call or initiation or request 142 to speak with a CSA 135, but before the customer 115 and CSA 135 actually engage in live communications or speak with each other directly. At 306, the intermediate computer 120 looks up customer data and associated access restrictions or parameters, and provides CSA 135 with the specified managed, restricted or limited access to stored customer data. While access may be considered to be granted by the intermediate computer 120 to the CSA computer 135, which causes customer data to be displayed or otherwise presented to the CSA 130, reference may be made to the intermediate computer 120 or host 125 granting access to the CSA 135 and CSA computer 130. The customer 115 and CSA 135 then communicate with each other, e.g. directly during a live phone conversation.

Figure 4:
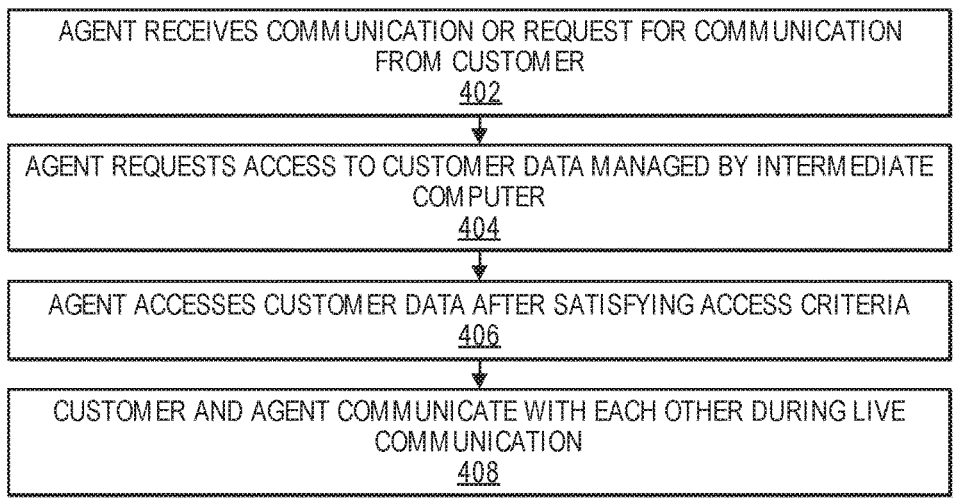
FIG. 4 is a flow diagram illustrating one embodiment of a method for requesting access to customer data.

Referring to FIG. 4, in an embodiment of a method performed from the perspective of, or involving, the CSA computer 130, the CSA computer 130 receives from the mobile communication device 110 a call or initiation or request to speak with the CSA 135 at 402. At 404, the CSA computer 130 transmits a message or request to the intermediate computer 120 for access to data for that customer 115 that is managed by intermediate computer 120. At 406, the CSA computer 130 is granted access 144 to customer data. The customer 115 and CSA 135 then communicate 145 with each other, e.g., during a live phone conversation or chat session. Further embodiments and aspects of embodiments are described in further detail with reference to FIGS. 5-17.

Figure 5:
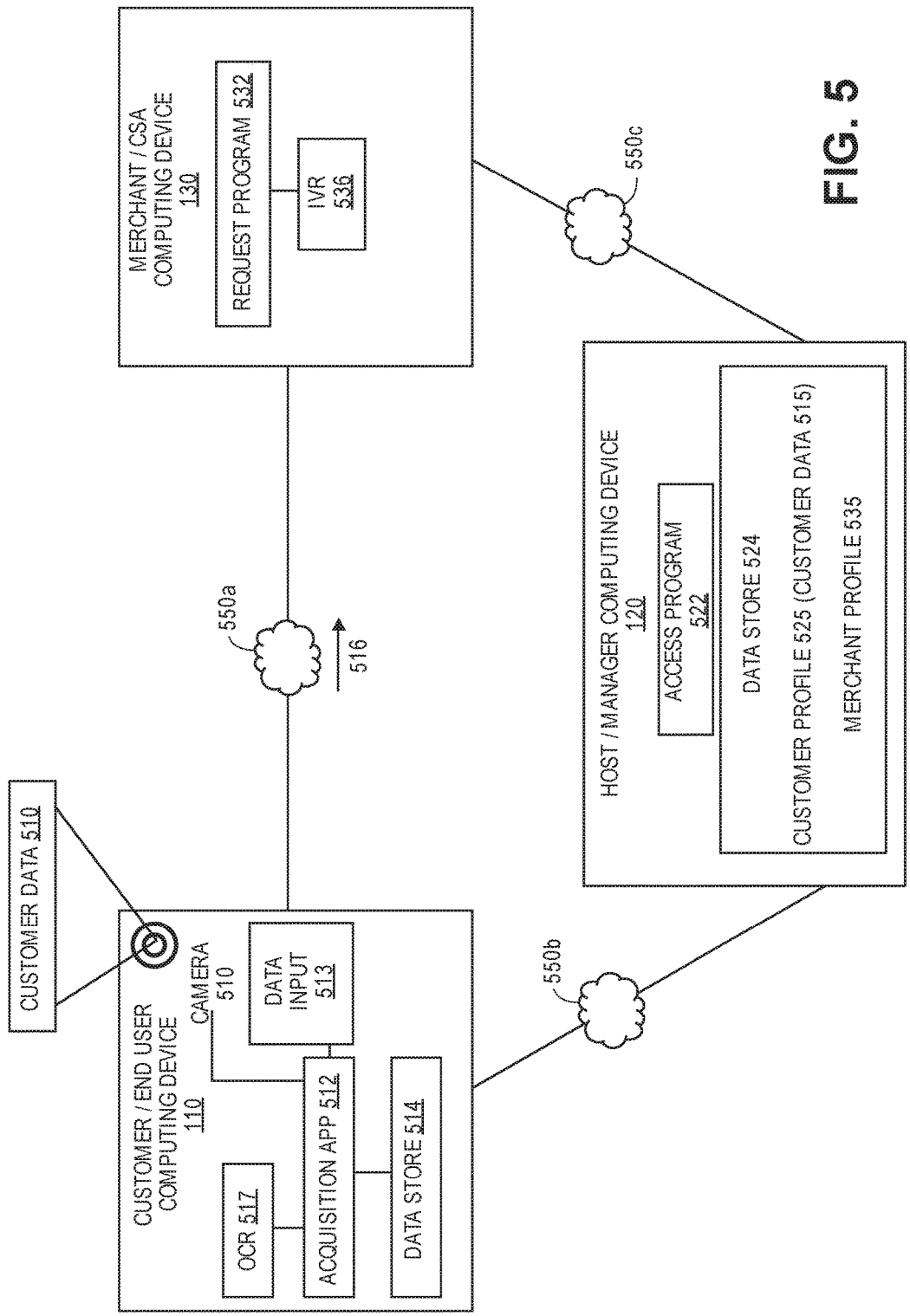
FIG. 5 is a diagram illustrating components of a system constructed according to one embodiment for managing access to customer data through an intermediate computer.

Referring to FIG. 5, a system constructed according one embodiment includes or involves one or more or all of the customer's computing device 110, intermediate computer 120, and CSA computer 130, or embody or execute instructions of an article of manufacture or computer program product for implementing various method steps. Computers or computing devices 110, 120, 130 may communicate with each other through respective networks 550a-c (generally, "network"). Example network 550 that may be utilized for communications between system components may be wired and wireless or cellular networks, and include, but are not limited to, a Local Area Network (LAN), a Wide Area Network (WAN), Metropolitan Area Network (MAN), a Wi-Fi network, and other suitable networks capable of transmitting data, and a combination one or more or networks. For ease of explanation, reference is made generally to a network 550, but embodiments may involve various networks, combinations thereof, and respective communications systems, and protocols.

The customer 115 may have accounts or memberships at various merchants 135, such as a financial institution, store or other merchant (generally, "merchant") and associated customer data 515. Customer data 515 may be within one or more of account documentation, a statement or bill, a credit, debit or other payment card, a financial instrument such as a check, a membership card (such as a grocery store or big box store club card) and a business card. For example, customer data 515 may include an account number or other account data, customer identification or number, membership number and other associated account, membership and customer-related data. Customer data 515 may also include personal information such as the customer's name, address, contact information, etc. Customer data 515 may also include authentication information or documents that include personal information and that can be used to verify the customer's identity such as a driver's license or other government issued card or document such as a social security card, a photograph or voice sample or other biometric data.

While FIG. 5 generally illustrates customer data 515, customer data 515 is defined as including data of the customer 115 including, but not limited to, types or categories of customer data 515 including account, membership, personal and authentication customer data 515. It will be understood that customer data 515 may include some or all of these types of data and/or other customer-related data.

In the illustrated embodiment, the customer's computing device 110 is a mobile communication device (generally, "mobile communication device 110"), which includes an image capture element such as a camera 520, an application or program 512 for customer data 515 acquisition ("Acquisition App" 512 in FIG. 5). The acquisition application 512 is operable to obtain or receive customer data 515 that is acquired, imported or otherwise generated or received utilizing the camera 510 or other data input element 513 such as a keyboard, keyboard attachment, on-screen keyboard or other user interface (UI) element, and store customer data 515 to a data store 514 as necessary. The camera 510 is operable to acquire an image or video, and may be, or contain, customer data 515. The mobile communication device 110 may, if necessary, also include or utilize a recognition program 517, such as an Optical Character Recognition ("OCR" 517 in FIG. 5) program operable to analyze image data or frames of video and determine customer data 515 in the form of text within the image or video frame.

In the illustrated embodiment, the intermediate computer 120 includes a storage/access application or program ("Access Program" 522 in FIG. 5) operable to receive, store and manage customer data 515 transmitted from the mobile communication device 110, and to manage how and when CSA 135 can access customer data 515. The intermediate computer 120 also includes a data store 524 for storing customer data 515 received from customer's mobile communication device 110. Customer data 515 may be in a customer profile 525, or access program 522 may generate a customer profile 525 based on customer data 515 received. Stored customer data 515 may include alpha-numeric text data, as manually entered or as determined using OCR 517, and/or image data (e.g., as acquired using camera 510).

The access program 522 also stores merchant profiles 535 identifying some or all of the types of data CSAs 135 require or would prefer to have during a customer service communication. For example, a financial institution may require certain personal and account information such as name and credit card number, whereas other merchants such as a telephone company, may require name, telephone and address data, and yet other merchants may require other types of data such as a photograph in addition to other account-related data. Each merchant may have its own types of required and preferred customer data 515 for customer service communications.

In the illustrated embodiment, the CSA computer 130 includes an application or program 532 ("Request Program" 532 in FIG. 5) operable to request access to customer data 515 managed by the intermediate computing device 120 before or during communication with the customer 115. Further details about how system components function and interact with each other and examples of how embodiments may be implemented are described with reference to FIGS. 6-17.

Figure 6:
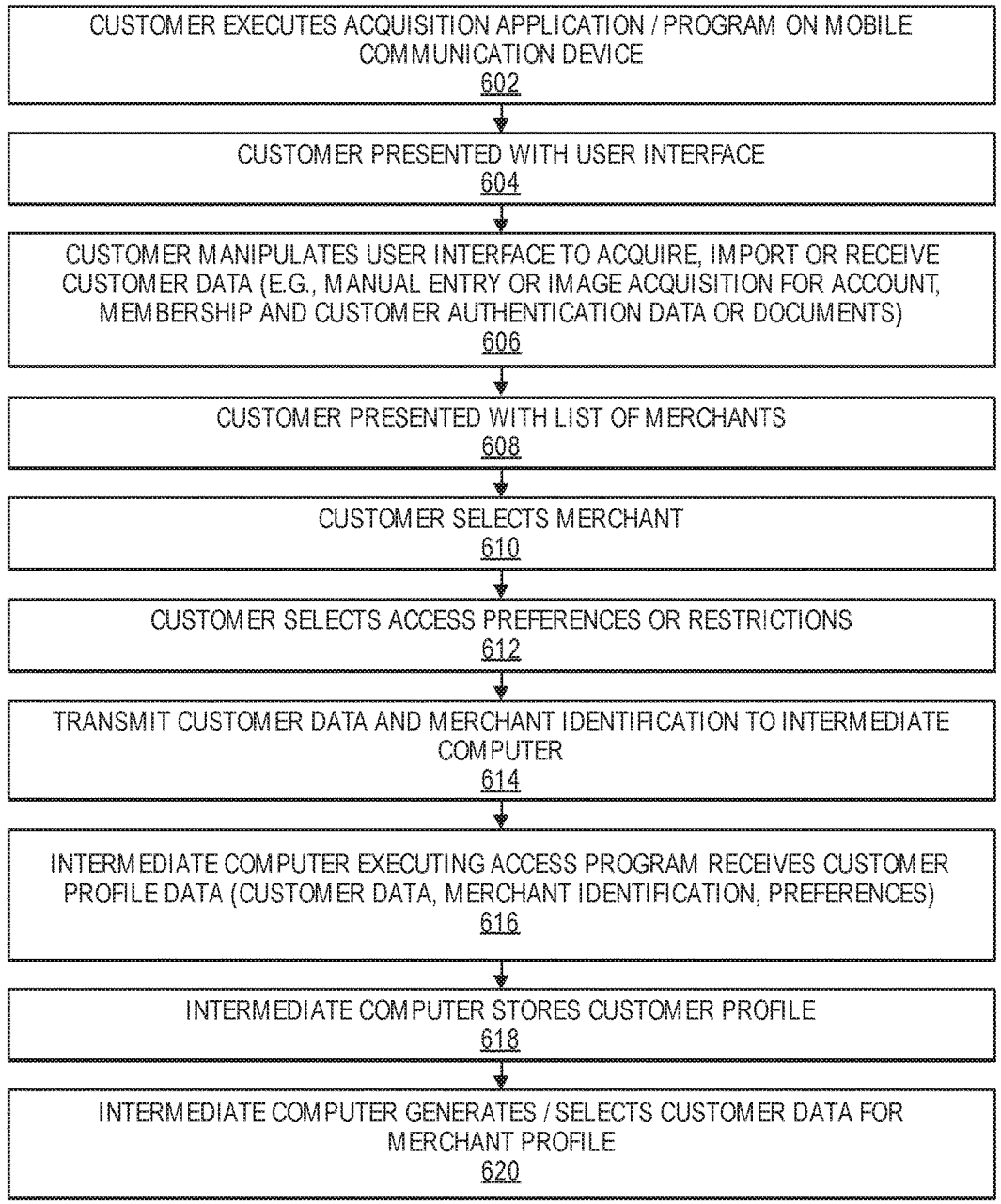
FIG. 6 is a flow diagram illustrating method steps for managing access to customer data through an intermediate computer according to embodiments.

Referring to FIG. 6, one embodiment of a method for managing customer data 515 and CSA 135 access to customer data 515 utilizing system components described above involves a set up procedure, which may be a one-time set up procedure with data and preferences being entered, selected or imported and stored at the intermediate computing device 120. As shown in FIG. 6, the method includes, at 602, the customer 115 downloading the acquisition application 512 (e.g., from the intermediate computing device 520), and executing the acquisition application 512 on the mobile communication device 110. At 604, the acquisition application 512 causes a UI to be displayed on the screen of the mobile communication device 110, and at 606, the customer 115 manipulates UI to acquire, import or receive customer data 515.

Figure 7:
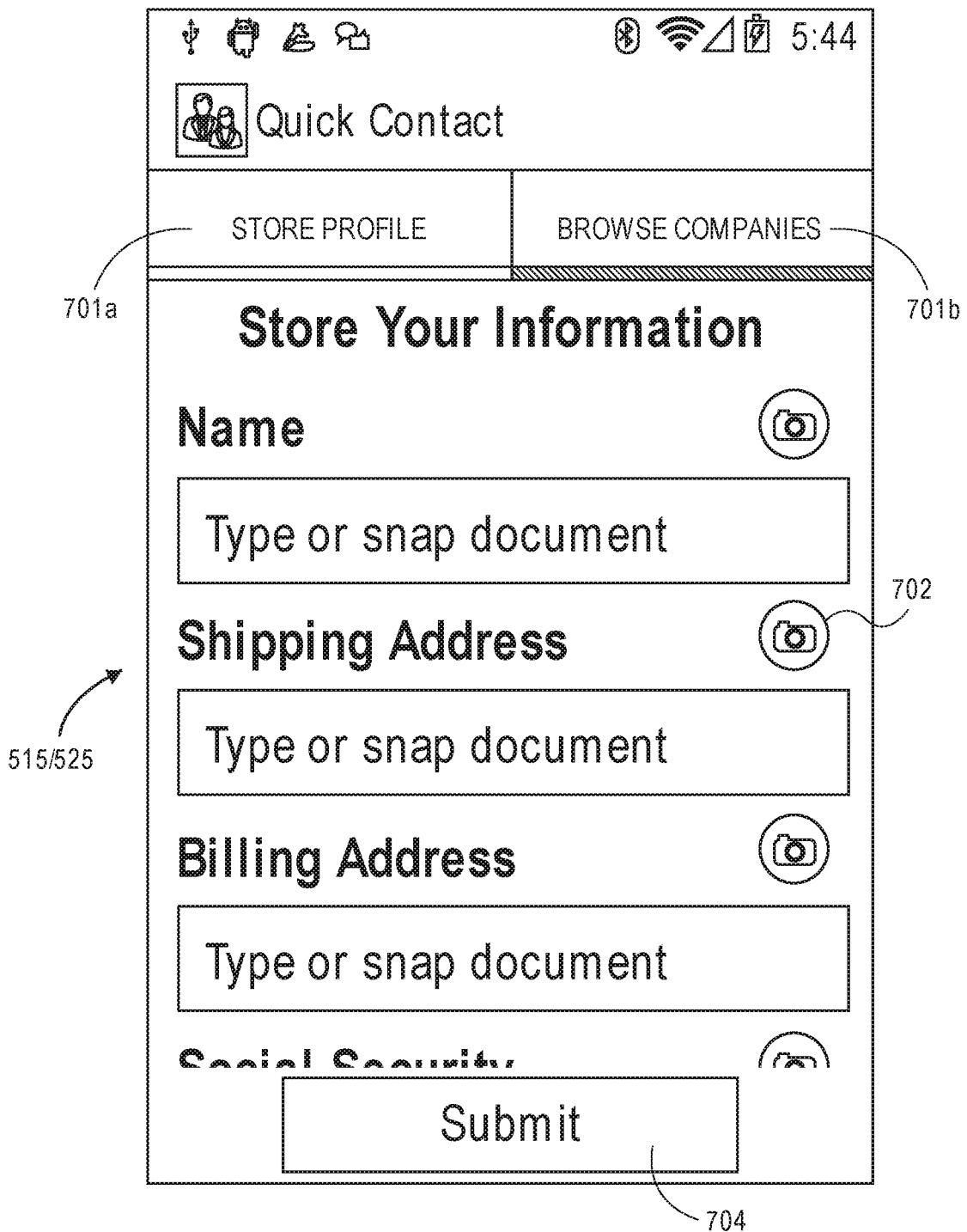
FIG. 7 shows an example of a screen shot of a user interface generated by an acquisition application for entering or acquiring customer data according to embodiments.

For example, referring to FIG. 7, the UI may include a menu option or toolbar 701*a* for entering customer data 515 or generating a customer profile 525 including customer data 515, and a menu option or toolbar 701*b* for browsing merchants or companies that the customer 115 can select for specifying access to be provided to that merchant or CSA 135.

In the illustrated embodiment, the customer 115 has selected the "Store Profile" menu item or toolbar 701*a* to enter or acquire customer data 515 and generate a customer profile 525. The customer 115 can enter or acquire customer data 515 in different ways.

For example, the customer 115 may manually enter or type customer data 115 into fields of a form using a keyboard display (not illustrated in FIG. 7) of the mobile communication device 110 that is displayed upon contact of the field to be populated. Thus, for example, the customer 115 may type in name, shipping address, billing address, social security number, or other types of customer data 515 as appropriate. The customer 115 may also select a camera icon 702, which invokes the camera 510 of the mobile communication device 110 to image or scan, for example, the customer's driver's license or other document, card or item that serves as or contains customer data 515, or from which customer data 515 can be extracted or determined using, for example, OCR program 517. The OCR program 517 can be executed to identify alpha-numeric data within the image then populate displayed fields and/or the customer profile 525. As another example in which the customer 115 wants to set up the system for calls to the customer's financial institution regarding credit card or checking account questions, the customer 115 may select a camera icon 702 to acquire images of a credit or debit card, and the recognition program 517 identifies alpha-numeric data within the credit or debit card such as card number, expiration date and name, and then populates corresponding fields within the "Store Profile" screen related to the determined credit or debit card data and/or customer profile 525.

It will be understood that the customer 115 may acquire images of various types of cards, payment instruments, statements and documents, examples of which include, but are not limited to, credit and debit cards, social security cards, checks, membership cards, business cards, account statements, driver's license, other identification cards or documents, and that various types of customer data 515, including one or more of account data, membership data, authentication data and personal data, may be extracted from images for use in creating a customer profile 525 with customer data 515. Further, the customer 115 may employ the camera 510 and/or recording or microphone capabilities of the mobile communication device 110 to acquire authentication data by taking a picture or recording a voice sample of the customer 115 or for data entry generally, and this data may also be added to the customer profile 525.

Figure 8:
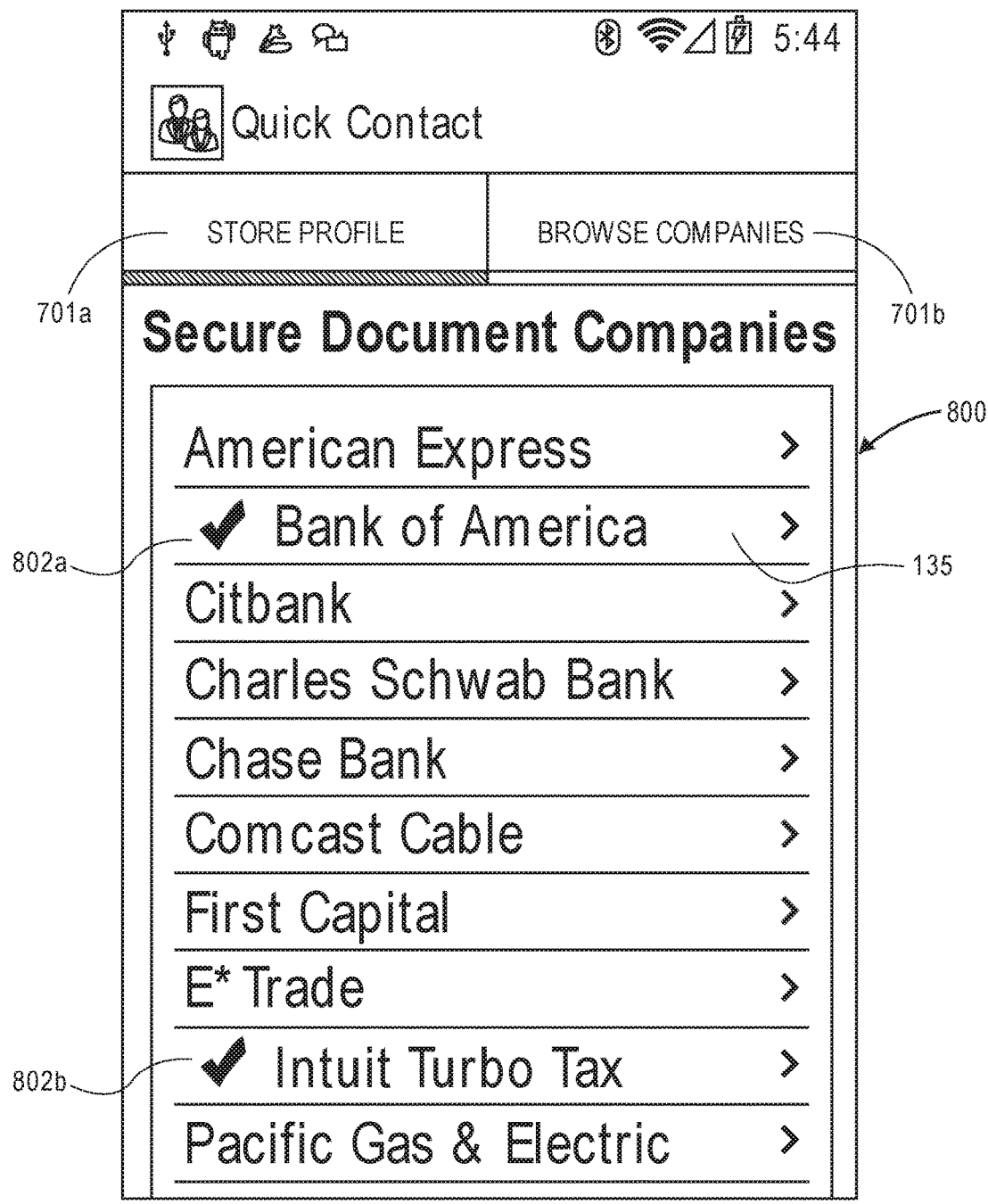
FIG. 8 shows an example of a screen shot of a user interface generated by an acquisition application for selecting a merchant that is to be given access to customer data according to embodiments.

Referring again to FIG. 6, at 608, and with further reference to FIG. 8, the customer 115 selects the "Browse Companies" menu option or toolbar 710*b*, and the acquisition application 512 presents a screen with a list 800 of merchants 135, and at 610, the customer 115 can select a merchant 135, as a merchant 135 that will have access to customer data 515. In the illustrated embodiment, the list 800 includes various financial institutions or finance related companies and a utility company, but embodiments are not so limited. In the illustrated embodiment, the customer 115 has selected a bank and a tax preparation program as indicated by check marks 802*a-b*.

Figure 9A:
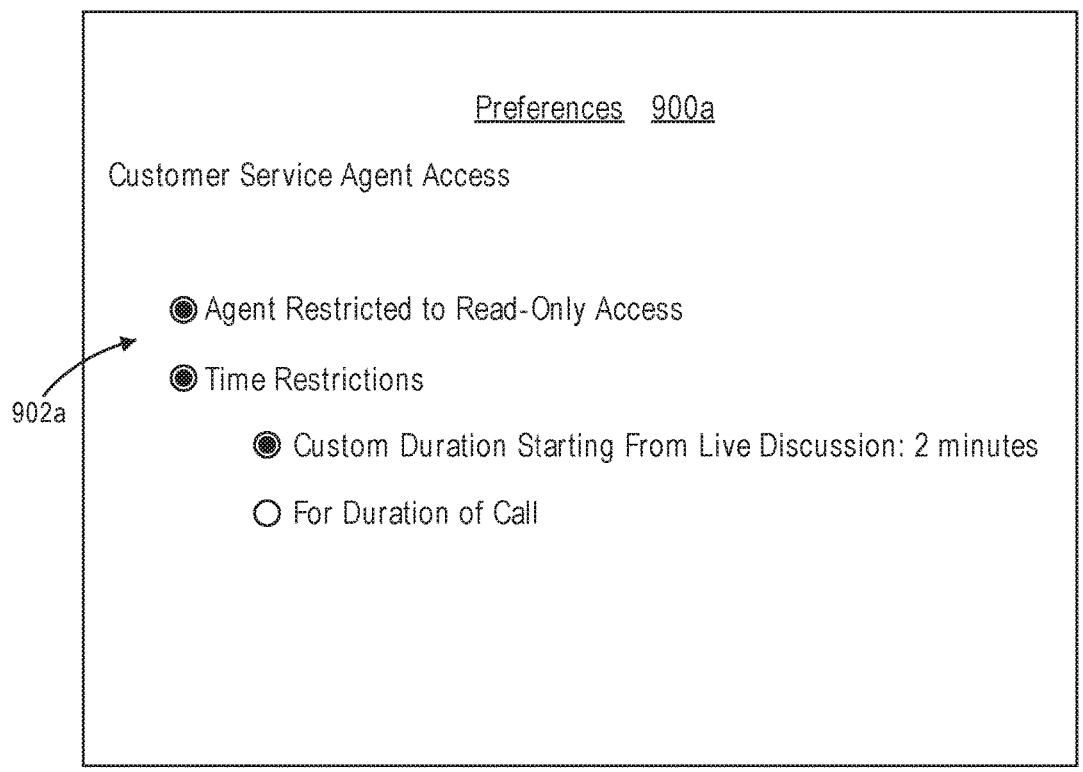
FIGS. 9A-B illustrate examples of customer data access preferences that can be selected or specified by a customer.
Figure 9B:
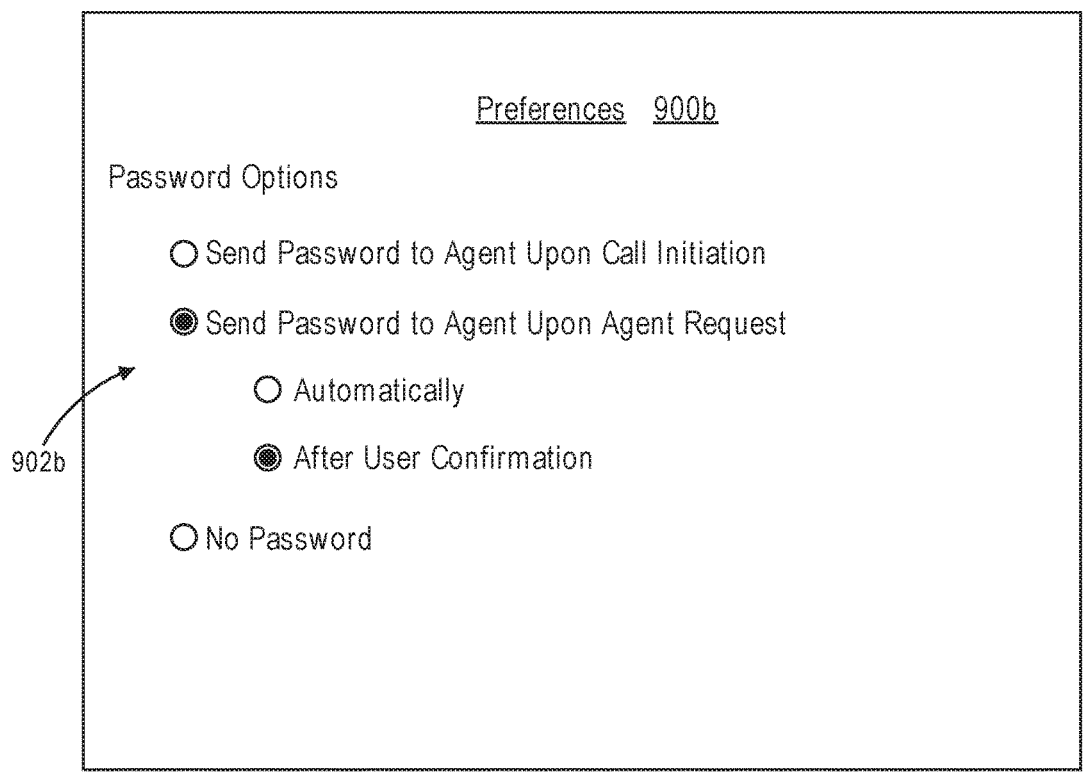

Continuing with FIG. 6, and with further reference to FIGS. 9A-B, certain embodiments allow the customer 115 to specify preferences or parameters concerning how the customer data 515 is managed and the type of access provided to the CSA 135 via the intermediate computer 120. For this purpose, at 612, the acquisition application 512 may display screens allowing the customer 115 to specify preferences that will govern CSA 135 access to customer data 515.

For example, as shown in FIG. 9A, the acquisition application 512 may generate a screen with preferences 900*a* relating to what type of access the intermediate computer 120 should grant the CSA 135. Options 902*a* for restricting access may, for example, specify that the CSA 135 should be restricted to read only access such that no downloading or copying of customer data 515 by the CSA 135 is permitted. The customer 115 can select from options related to the CSA 135 only being able to view customer data 515, and time restrictions on access, which may be based on call or communication duration or selected or specified by the customer 115. Thus, for example, customer data 515 may be accessible only for the duration of the customer service communication such that after the CSA 135 communication has terminated, the intermediate computer 120 also terminates CSA 135 access to the customer data 515. In the illustrated example, the customer 515 has specified that the CSA 135 only has read-only access, and that read-only access is also restricted in terms of time such that the CSA 135 can view the customer data 515 for two minutes. These preferences 900*a* may be specified for all merchants 135, or on a merchant-by-merchant basis depending on, for example, the type of merchant 135 and type of customer data 515 to be discussed.

FIG. 9B illustrates another screen for other preferences 900*b* involving options 902*b* for passwords or other forms of authentication data. In certain embodiments (described in further detail below), the customer 115 can specify how passwords should be managed, e.g., that no passwords will be used such that the agent can request customer data 515 from the intermediate computer 120 without a password, that a password is required before the CSA 135 can access customer data 515, and if so, when the password should be transmitted to the CSA 135, e.g., when the customer 115 initiates contact with the CSA 135 such that when the intermediate computer 120 receives the CSA's request to access customer data 515, the intermediate computer 120 can compare a stored password, e.g., provided by the customer 115 beforehand, and the received password to determine whether access should be granted, or in response to a request by the CSA 135 for the password, after the intermediate computer 120 has informed the CSA 135 that access requires a password from the customer 115. Passwords can be one-time passwords or utilized for multiple merchants and/or multiple requests for access to customer data, randomly generated for each customer service communication, or selected by the customer 115.

Figure 10:
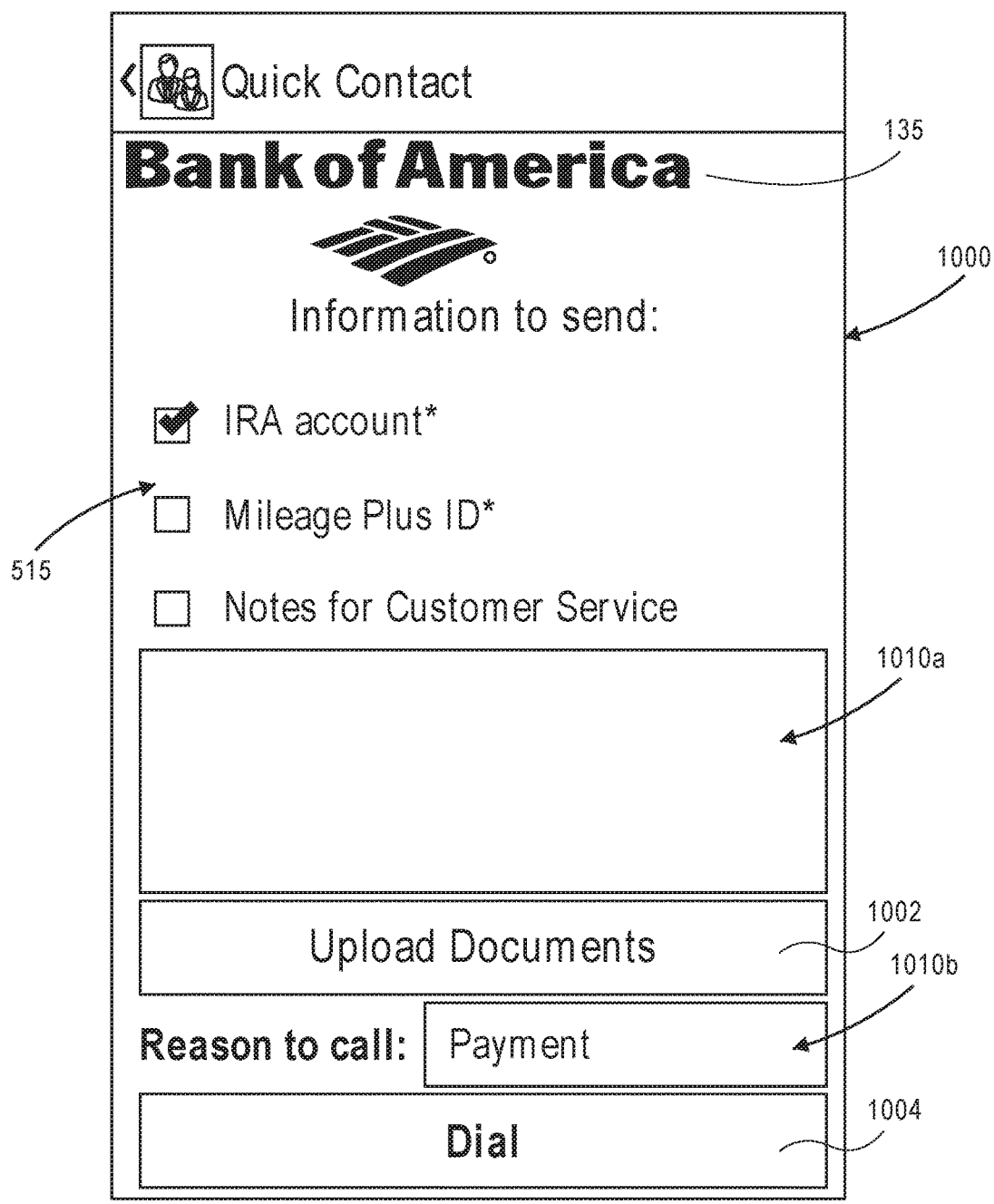
FIG. 10 shows an example of a screen shot of a user interface generated by an acquisition application that allows a customer to take actions relative to a selected merchant that is to be given access to customer data according to embodiments.
Figure 11:
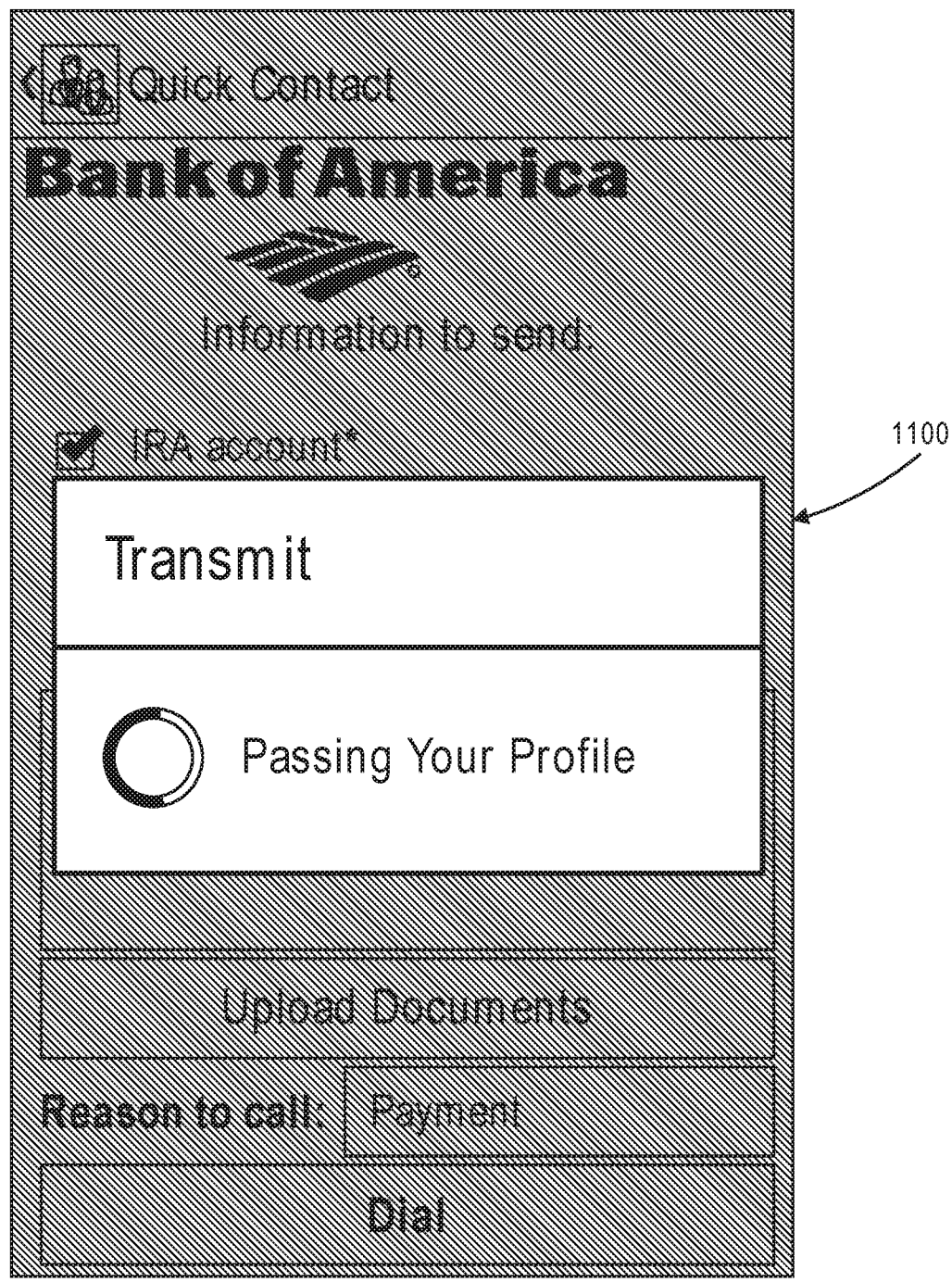
FIG. 11 shows an example of a screen shot of a user interface generated by an acquisition application showing transmission of a customer profile to an intermediate computer according to embodiments.

Referring again to FIGS. 6-7, and with further reference to FIG. 10, after the customer 115 has entered, imported or acquired customer data 515, specified merchants 135 and any preferences 900, the customer data 515, or customer profile 525 including customer data 515, is transmitted from the mobile communication device 110 to the intermediate computer 120 at 614, e.g., in response to the customer 115 selecting the "Submit" button 704 (FIG. 7), or "Upload Documents" button 1002 as shown in FIG. 10 depending on how the acquisition application 512 is configured and the timing of when some or all of the customer data 515 is transmitted to the intermediate computer 120 before the customer 115 engages in live communication with the CSA 135. For example, "Upload Documents" 1002 may be used to upload images of documents such as a driver's license or other card or document, separately of data manually entered the customer 115. While certain embodiments are described with reference to uploading documents or images thereof separately from other customer data 115, it will be understood that all customer data 115 may be uploaded simultaneously or by the customer 115 pressing UI element.

The customer profile 525 or customer data 515 that is transmitted ("transmit" status screen 1100 shown in FIG. 11) may include text data (e.g., as determined using OCR 117), manually entered data (e.g., into a customer profile 525 form, or into a form for a specific merchant 135), and other types of data such as images and voice samples in embodiments in which the access program 522 employs OCR 117, or if images or voice samples are used for customer 115 identification, authentication or verification.

At 616, the intermediate computer 120, executing access control application program 522, receives the customer profile 525 or customer data 515 (generally, customer data 515). At 618, the access program 522 stores the customer profile or data 515 in a data store 524, and at 620, generates a document or database or table entry including customer data 515 for a profile 535 of a merchant 135 identified by the customer 115.

For example, referring to FIG. 12, step 620 may involve the intermediate computer 120 determining the selected merchant 135, looking up merchant profiles 535, which may specify types of customer data 515 that are required or preferred by the merchant 135, and types of customer data 515 that are optional for customer service communications with the merchant 135. Thus, in the example illustrated in FIG. 12, a merchant profile 535 may specify that one merchant requires customer data 515 in the form of customer name, shipping address, billing address, social security number and account number, whereas other merchants require different types of customer data 515 such as only name and account number. It will be understood that different merchants 135 may require or prefer different types and combinations of customer data 515, and the types of customer data 515 noted above are provided as examples. The access program 522 can select customer data 515 for the merchant profile 535 or generate a document or table or database entry with customer data 515 corresponding to a profile 535 of a selected merchant 135. The selected customer data 515 or generated document or entry may be selected or generated according to customer preferences 900, e.g., the customer 115 agreed to share all customer data 515 with the CSA 135, only some customer data 515, or only required, but not optional, customer data 515. Thus, the selected customer data 515 or generated document or entry may include some or all of the types of customer data 515 stored by the intermediate computer 120.

According to one embodiment, method steps involving entering, importing or acquiring customer data 515, and transmitting customer data 515 to the intermediate computer 120 may occur before any communication between the customer 115 and CSA 135 has been initiated, e.g., before any call or on-line chat session has begun depending on the computing devices and communication protocols employed. According to another embodiment, such method steps may occur in preparation for live communication between the customer 115 and CSA 135, and after the customer 115 has initiated a communication, e.g., by calling the CSA and navigating a call menu 536, but before the customer 115 and CSA 135 engage in live discussion.

For example, referring again to FIG. 10, the acquisition application's 512 UI may include a screen 1000 that lists customer data 515 and/or documents that have been imaged or scanned (e.g., IRA account data, Mileage Plus ID as shown in FIG. 10) and allows the customer 115 to select (noted by the "check") documents or customer data 515 that the CSA 135 can access for a customer service communication to be initiated. Thus, as shown in FIG. 10, imaged customer documents or other customer data 515 can be uploaded to the intermediate computer 120 separately of other customer data 515 if not uploaded earlier, but before live discussion with the CSA 135.

For example, as shown embodiment illustrated in FIG. 10, the customer 115 may also provide other customer input 1010 in the form of a note or message prepared 1010*a* using a keypad interface of the mobile communication device 110 or a note or message 1010*b* selected from a list of reasons in the screen 1000. The customer 115 can specify, for example, the nature or reason for the call so that the CSA 135 not only can access customer data 515 before live discussion, but also know why the customer 115 is calling. The list of reasons can be a standard list applicable to various merchants 135 or may be different for each merchant 135 or category of merchant 135. Thus, merchants 135 may specify which reasons should be displayed when the customer 115 input involves a particular merchant 135 or the customer 115 selects a merchant 135 for which the customer 115 is entering, selecting or importing customer data 515 for eventual customer service communications.

Figure 13:
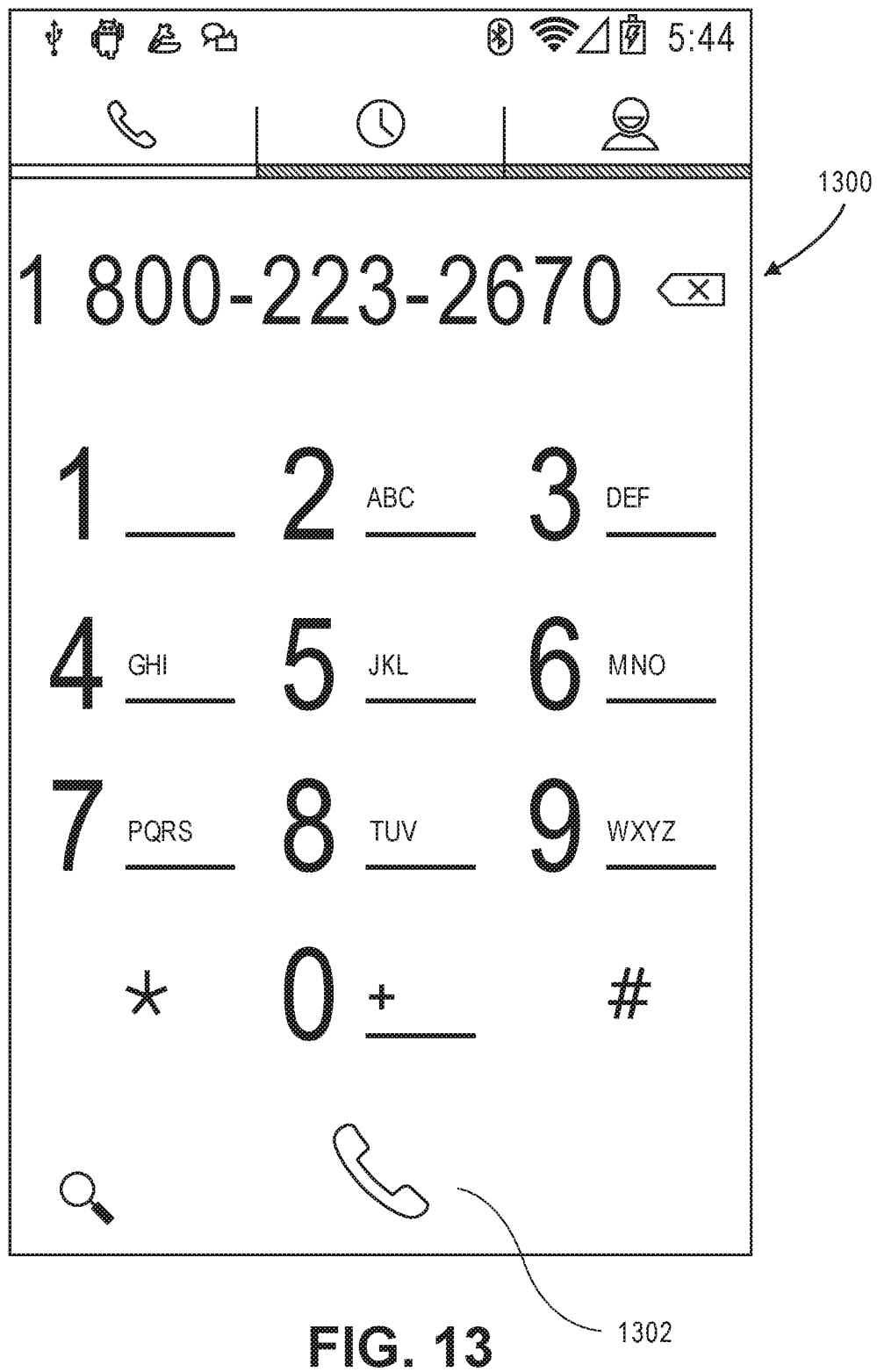
FIG. 13 shows an example of a screen shot of a user interface generated by an acquisition application for initiating a communication with a customer service agent.
Figure 14:
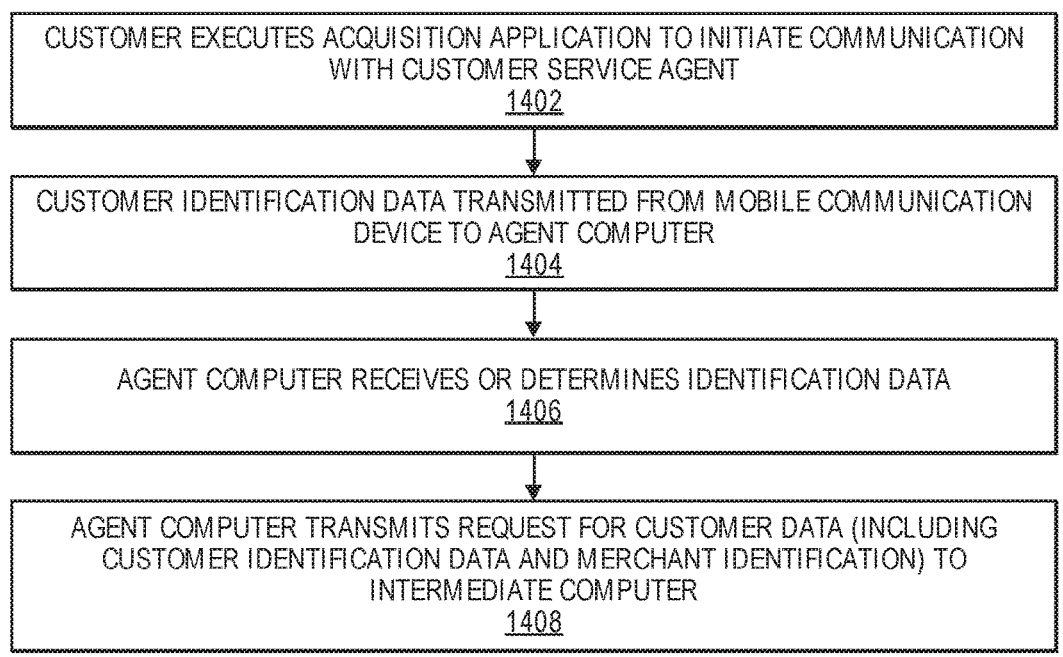
FIG. 14 is a flow diagram illustrating method steps for allowing a customer service agent to request access to customer data utilizing customer identification data.

Referring to FIGS. 13-14, and with further reference to FIG. 5, when the customer 115 is ready to contact CSA 135 for customer service, at 1402, the customer 115 executes the acquisition application 512 to initiate a communication with the CSA 135. For example, the customer 115 navigates the list of merchants 135 (as described above) and selects the merchant 135 the customer 115 wishes to contact, and the customer 115 is given the option to "Upload Documents" 1002 to the intermediate computer 120 (if not done earlier), and then presses "Dial" 1004 to initiate a call to the CSA 135 (e.g., by auto dial, or by populating a telephone number field in a keypad 1300 displayed on a screen of the mobile communication device 110 as shown in FIG. 13). When the customer 115 presses "Dial" 1004 to initiate a call to the CSA 135 (FIGS. 10 and 12), the acquisition application 512 looks up the phone number, or the customer 115 can use a keypad 1300 of the mobile communication device 110 to enter the number or press "dial" 1004 or the "phone" icon 1302 to dial the CSA's telephone number to initiate a call to the CSA 135. While embodiments are described with reference to calling a CSA 135, other embodiments may involve e-mail or on-line chat or other electronic communications.

While customer data 515 and/or documents can be uploaded to the intermediate computer 120 before any communication is initiated (before "Dial" 1004 is pressed at 1304), in other embodiments, the customer 115 initiates a communication, e.g., by pressing "Dial" 1004 to call the CSA 135, and then customer data 515 including imaged documents or text determined therefrom are transferred to the intermediate computer 120 while, for example, the customer 115 navigates a call menu or interactive voice response (IVR) menu 536 ("IVR" in FIG. 5) of the CSA 135, but before the customer 115 and CSA 135 engage in a live discussion. While certain embodiments are described with reference to integration within a call menu, it will be understood that this is provided as but one example of how embodiments can be implemented and in a non-limiting manner since embodiments can be implemented separately or independently of such menus.

Continuing with reference to FIGS. 5 and 14, at 1404, customer identification data 516 is transmitted from the mobile communication device 110 to CSA computer 130. In the example in which the customer 115 is calling the CSA 135, the customer identification data 516 is a telephone number of the mobile communication device 110. Thus, the same computing device 510 that executes the acquisition application 512 may also be used to call the CSA 135. In other embodiments, one computing device such as the mobile communication device 110, executes the acquisition application 512 and is used to transmit customer data 515 to the intermediate computer 120, while the customer 115 calls the CSA 135 with another communication device, and the customer identification data 516 is the telephone number of that other communication device 110. In other embodiments, rather than calling the CSA 135, communications may involve e-mail or an on-line chat session or other communications and involve associated customer identification data 516.

At 1406, the CSA computer 130 receives the communication (in this example, a call), and receives or determines the identification data 516 (in this case, telephone number). In other embodiments, depending on the computing devices and communication protocols employed, the customer identification data 516 may also be an electronic mail address or an IP address of the computing device 110 utilized to transmit an electronic message or initiate the on-line chat session. For ease of explanation, reference is made to customer identification data 516 in the form of a telephone number, but it will be understood that customer identification data 516 may be other types of data relating to other forms of communication or other identification data that identifies the customer 115.

At 1408, the request program 532 executing on the CSA computer 130 transmits a request to the intermediate computer 120 to access customer data 515, together with the customer identification data 516 (e.g., telephone number) received from or determined from data of the call made by the customer 115 using the mobile communication device 110 or other communication device.

Figure 15:
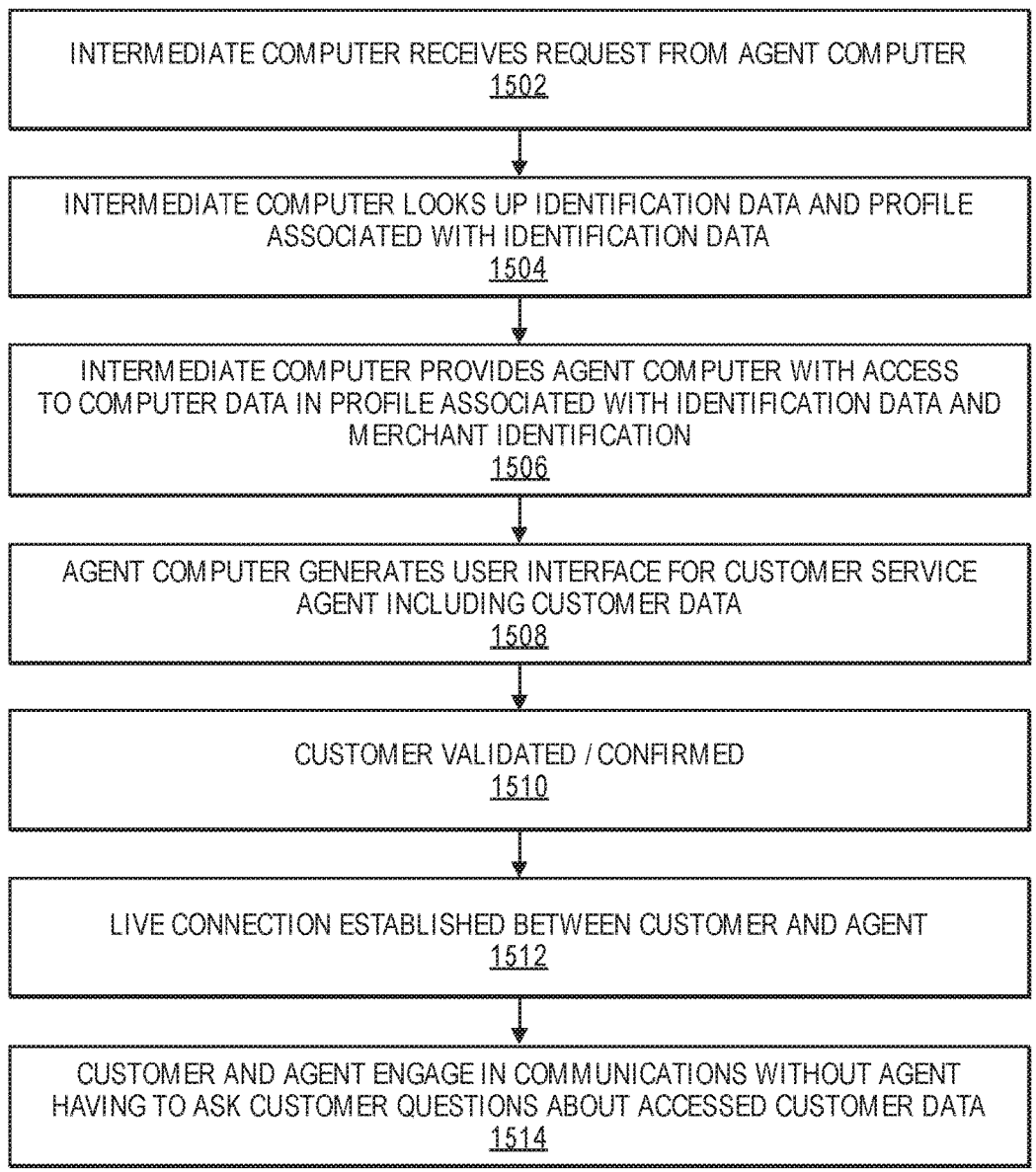
FIG. 15 shows an example of a screen shot of a user interface generated by a request application and displayed to a customer service agent or merchant according to embodiments.

Referring to FIG. 15, at 1502, the intermediate computer 120 receives the request from the request program 532 executing on the CSA computer 130, and at 1504, searches the data store 524 for matching customer identification data 516 and associated customer profile 525 or selected customer data 515 or generated document or entry including customer data 515.

At 1506, assuming the access program 522 identifies matching customer identification data 516, the access program 522 provides request program 532 with access to customer data 515 associated with the customer identification data 516 in accordance with any restrictions or limitations specified by the customer 115. Thus, for example, in order to provide for enhanced customer data security, the access program 522 may only allow the request program 532 to access customer data 515 such that it can be displayed, but not saved or copied by the CSA 135, or allow access to customer data 515 that is displayed for only a certain time, or only for the duration of the call, after which access is terminated and the customer data 515 is no longer available to the CSA 135. Thus, embodiments address concerns about personal information security by limiting how the CSA 135 contacts, views or interacts with customer data 515 and eliminating or reducing leaks or theft of customer data 515 through CSAs 135.

At 1508, the request program 532 generates a UI for the CSA 135 including accessed customer data 515, and at 1510, the CSA 135 or CSA computer 130 validates or confirms the customer 115 based at least in part upon the accessed customer data 515.

Figure 16:
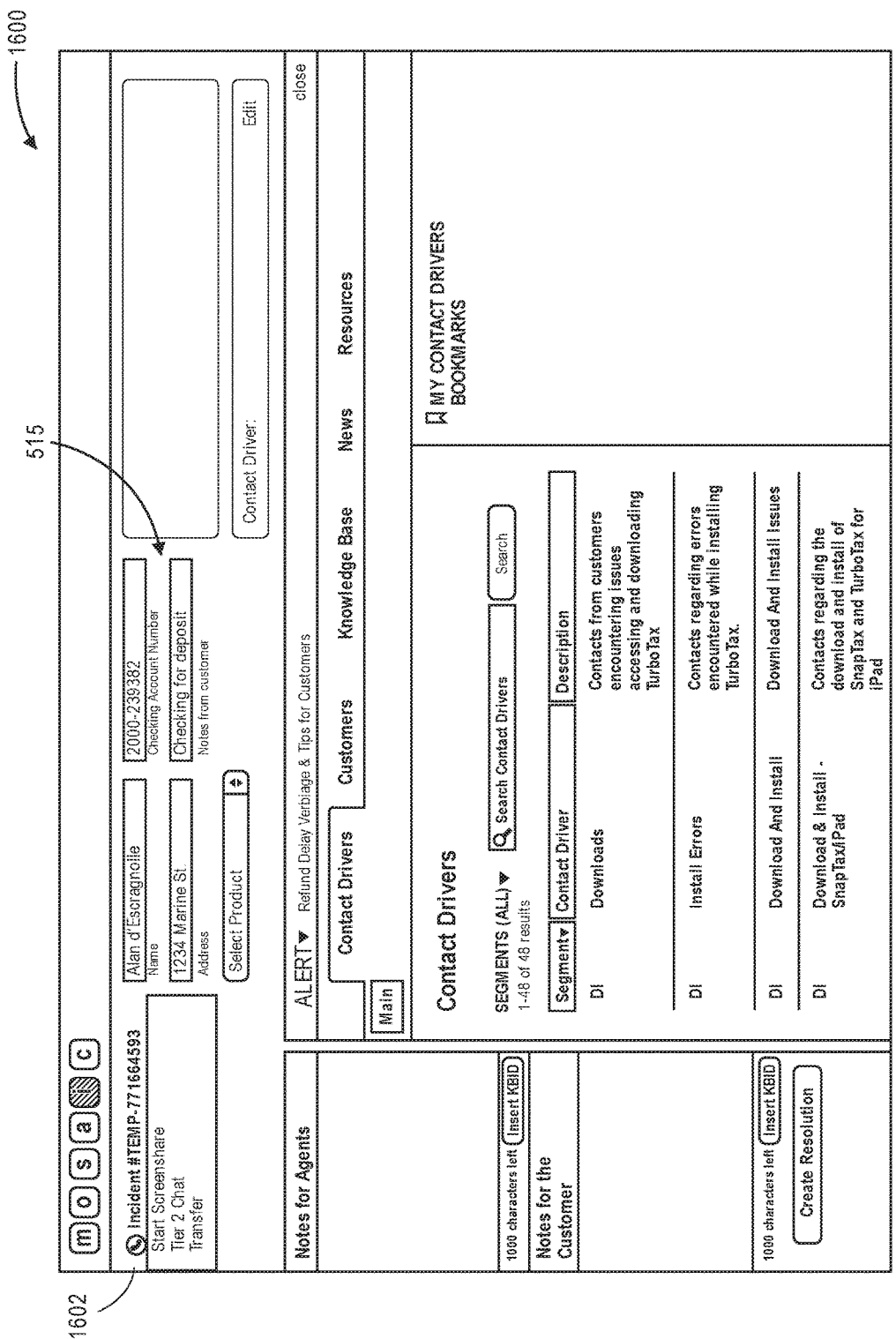
FIG. 16 is a flow diagram illustrating method steps involving an intermediate computer for allowing a customer service agent to access to customer data.

For example, referring to FIG. 16, a CSA or merchant facing UI 1600 includes customer data 515 in the form of customer name, address, checking account number and notes or a message selected or input by the customer 115. This customer data 515 is displayed as part of an assigned incident 1602 or customer service request, together with other UI elements utilized and operable by the CSA to document or process the customer service call. For this purpose, the fields of the merchant profile 535 provided to the intermediate computer 120 can be mapped to fields of the CSA or merchant facing UI 1600 such that customer data fields 1604 are populated with customer data 515 selected or retrieved by the access program 522, which is mapped to fields of the merchant profile 535, which is mapped to fields of the CSA or merchant facing UI 1600. Thus, the CSA or merchant facing UI 1600 includes UI elements generated by the request program 532, or by a program to which the request program 532 is an add-on or plug in, and includes data that is provided by merchant computers as well as customer data 515 accessed via the intermediate computer 120. In the illustrated embodiment, the CSA or merchant facing UI 1600 is for customer service for a tax preparation application, e.g., available from Intuit Inc., and the customer 115 is calling about a question concerning a tax return or tax preparation program.

While FIG. 16 illustrates an embodiment in which customer data 515 is accessed and displayed to the CSA 135, in other embodiments, in which customer data 515 is used for purposes of validation or authentication, such validation or authentication steps can be performed by the access program 522 of the intermediate computer 120 on behalf of the CSA 135. In this manner, the access program 522 indicates whether the customer 115 is validated or authenticated according to criteria or standards provided by the merchant 135, without having to display any of the customer data 515 to the CSA 135. Embodiments thus further enhance customer data 515 security since customer data 515 is received by the intermediate computer 120, analyzed relative to the merchant profile 535 and validation or confirmation criteria, and the access program 522 sends a response back to the request program 532 indicating whether the customer 115 is validated or confirmed. Such embodiments can minimize or eliminate the CSA's need to view or interact with customer data 515, thus further enhancing customer data 515 security and eliminating or further reducing customer data 515 leaks through CSAs 135.

For example, the access program 522 may confirm that the customer 115 is a confirmed user of a tax preparation program supplied by the merchant 135, or the customer 115 is confirmed to be an account holder at a merchant 135 of a financial institution. For this purpose, the merchant 135 may allow the access program 522 to retrieve information about its customers or account holders so that the access program 522 can perform the validation or confirmation analysis.

Referring again to FIG. 15, at 1512, a live, real-time connection is established between customer 115 and the CSA 135 such that at 1514, the customer 115 and CSA 135 engage in live communications and are able to proceed to the customer's question, without the CSA having to ask routine questions about customer data 515 since the CSA 135 already accessed such data via the intermediate computing device. The live communication may be speaking with each other during a call, video, electronic mail exchange or on-line chat, or other form of communication.

Other embodiments that involve the same or similar communications and interaction among the customer's computing device 110, the intermediate computer 120 and CSA computer 130, and other aspects that may be incorporated into system and method embodiments described above.

While embodiments described with reference to FIGS. 1-16 involve the intermediate computer 120 managing customer data 515 and restrictions concerning how and when CSAs 135 can access customer data 515, in other embodiments, the access program 522 of the intermediate computer 120 is embodied within the acquisition application 512 executing on the mobile communication device 110. These embodiments involve some of the same method steps and communications as described above, which are not repeated for ease of explanation, except that customer data 515 access is resolved directly between the acquisition/access application 512 and request program 532.

For example, in one embodiment, after customer data 515 including customer documents have been entered, imported, imaged or scanned, customer data 515 is stored in a data store 514 of the mobile communication device 510, and the customer 115 proceeds to call the CSA 135. Identification data such as a telephone number is transmitted from the mobile communication device 110 to the CSA computer 130 and is received by the request program 532, which may be a plug-in to the merchant's interactive voice response (IVR) menu 536. The customer 115 is greeted with an IVR call menu 536 and may navigate to a certain branch or node of the call menu, at which time the customer 115 decides or selects a menu option to provide the CSA 135 with access to customer data 515 stored in the data store 514. For example, the customer 115 may press of a button on a screen of the mobile communication device 110 corresponding to a call menu option. Thus, before the customer 115 speaks with the CSA 135, the customer 115 may navigate IVR call menu options "press 6 for billing", and then further navigate to "press 8 to allow the agent to access your information." In response to the customer 115 pressing menu option "8," the request program 532 transmits a request for access to customer data 515 together with the telephone number if necessary, and the acquisition/access program 512 provides the CSA 135 with access to the customer data 515 according to the established restrictions or preferences, e.g., read only access, as described above. The request program 532 can be granted access to secure customer data 515 in data store 514 before the CSA 135 is even connected with the customer 115 for a live discussion, while the customer 115 is waiting to speak with the CSA 135 and while the customer 115 is navigating the IVR menu. While embodiments have been described in the context of controlling access to customer data 515 during IVR menu navigation, other embodiments do not involve IVR menu 536 navigation and instead provide the CSA 135 access to customer data 515 based on data initially transmitted identification or call data. It will be understood that the manner in which embodiments can be implemented may depend in part on the system configuration and communication protocols employed by the acquisition/access application 512 and request program 532.

Embodiments may, for example, be embodied within a plugin to an IVR call menu 536 program utilized by the CSA 135.

Other embodiments utilizing system configurations and various method steps described above also involve a password handshake to provide a further layer of security before a customer service agent is granted access to customer data.

For example, in one embodiment the customer 115 initiates a communication with CSA 135, e.g., by calling the CSA 135. The request program 532 receives the communication request and customer identification data 516 (telephone number) and responds back to the acquisition application 512 requesting a password, in response to which the acquisition application 512 or the customer 115 provides the password. In other embodiments, the password is provided with the initial communication together with the customer identification data 516. The request program 532, having received the customer identification data 516 and passwords, transmits a request with the identification and password to the intermediate computer 120. The access program 522 searches data store 524 for a database entry associated with the identification data, compares a stored password or password received from mobile communication device 110 with the password received from the request program 532, and if the passwords match, provides the CSA 135 with access to customer data 515.

Another embodiment involving a password involves various steps as described above (and not repeated for ease of explanation), but when the access program 522 receives a request from the request program 532, the access program 522 determines that a password is required (e.g., as a preference 900 specified by the customer 115 while utilizing the acquisition application 512). The access program 532 responds to the request program 532 indicating that a password is required before the CSA 135 can access customer data 515. The request program 532 then requests the password from the customer 115, and the acquisition application 512 or customer 115 provides the password. The request program 532, now having the password, transmits another request with the password (or the password together with the customer identification data 516) to the intermediate computer 120, and the access program 522 looks up the customer identification data 516 to identify the database entry or document associated with the customer identification data 516 (if necessary), compares a stored password or password received from the customer 115 with the password received from the request program 532, and if the passwords match, provides the CSA 135 with access to stored customer data 515.

Yet another embodiment involves a callback request such that a first communication is initiated to allow the CSA 135 to access customer data 515 for validation or confirmation, the first communication is terminated, and then the CSA 135 calls the customer 115 back. This way, the customer 115 does not have to wait on hold while the CSA 135 reviews customer data 515, and during the follow-up call, the customer 115 and CSA 135 can then proceed immediately or more quickly to the customer's question. Call back selections or instructions can be transmitted with the initial communication or selected by the customer 115 selecting a "call back" IVR menu option.

Thus, with embodiments, the CSA 135 can review customer data 515 before engaging in live communication with the customer 115 so that the customer 115 and CSA 135 can save valuable time by not having to discuss routine introductory questions about the customer data 515, thus reducing the number of questions that need to be asked and time required for customer service discussions since the customer 115 and CSA 135 can proceed immediately or more quickly to the more important matter about which the customer 115 is calling. For example, it has been estimated that oral verification by CSAs 135 can consume up to 20% of call time, which embodiments can eliminate or substantially reduce.

Embodiments not only improve the customer experience when calling customer service by reducing wait times and time required for live discussion, but from the merchant's perspective, embodiments also yield benefits in terms of increased customer service capacity, improved customer satisfaction, and improved net promoter scores. Embodiments also address concerns about personal information security since embodiments can restrict how and when customer data 515 is displayed or accessed, or not allow CSAs 135 to access or view customer data 515 at all.

Figure 17:
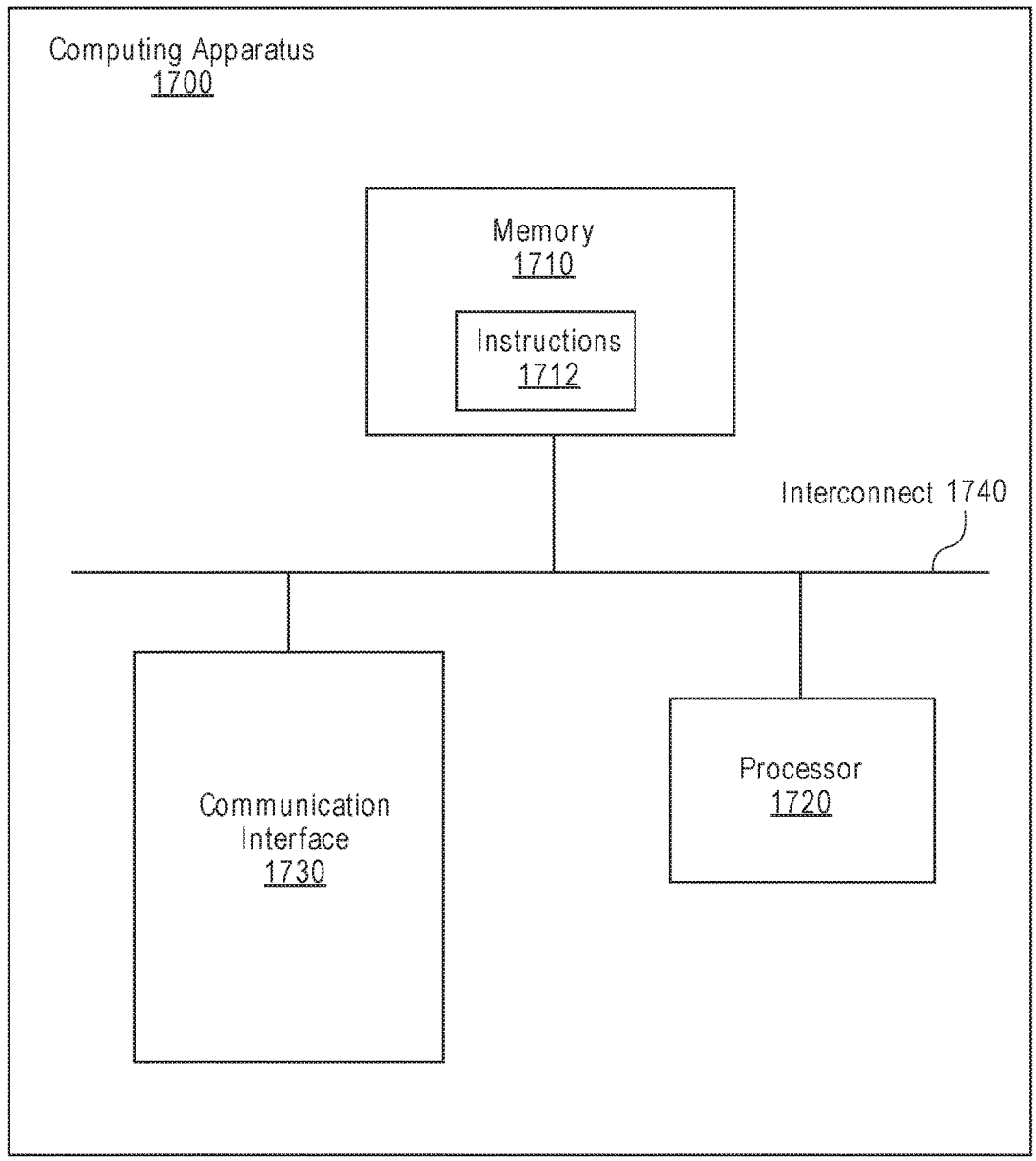
FIG. 17 is a block diagram of components of a computing device or system in which various embodiments may be implemented or that may be utilized to execute various embodiments.

FIG. 17 generally illustrates components of a computing apparatus 1700 that may be utilized to execute embodiments including a memory 1710, account processing program instructions 1712, a processor 1720 to execute account processing program instructions 1712, a network or communications interface 1730, e.g., for communications with a network or interconnect 1740 between such components. The memory 1710 may be or may include one or more of cache, RAM, ROM, SRAM, DRAM, RDRAM, EEPROM, SDRAM and other types of volatile or non-volatile memory capable of storing data. The processor unit 1720 may be or may include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented.

Method embodiments may also be embodied in, or readable from, a non-transitory, computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 performs steps or executes program instructions 1712 within memory 1710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments have been described with reference to communications between a customer and CSA, customer and host, and CSA and host, embodiments may be implemented as applications or programs on a particular computing device, such as an application for a mobile communication device such as a smartphone or table computing device with communication capability, or as a client application or program that recognizes the mobile communication device phone number and requests customer data from the intermediate computer utilizing that identification data, or as interactive methods and systems.

Embodiments may be implemented as or embodied within a smartphone application that scans and stores customer's documents (credit cards, driver's license etc.), which may be processed with OCR as necessary, the results stored as text within or associated with corresponding fields. Customer data may also be in the form of images of documents.

Embodiments may also be implemented as or embodied within remote client applications at the CSA or merchant computer, or within a customer service management application or voice responder. For example, embodiments may be implemented as a plug-in to a call menu preprogram or otherwise integrated into a customer service program such as a voice response system utilized by the merchant such that customer data is transmitted to the intermediate computer for access by the CSA in response to selection of a menu item by the customer, or by pressing a button or number on a smartphone keypad.

Depending on how embodiments are configured, embodiments provide restricted access (e.g., read only or time restrictions), and can prevent manipulation or downloading of customer data.

As a further example, while certain embodiments are described with reference to customer service for a tax preparation application for financial institution such as banks and credit card companies, embodiments are also applicable to various other customer service applications for other merchants, including retail merchants.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially. For example, it will be understood that customer data may be transmitted to the intermediate computer before any communication with a CSA is even initiated, e.g., as part of a set up procedure, whereas customer data may also be transmitted to the intermediate computer after selection of a merchant, but before the merchant number is dialed, or transmitted to the intermediate computer after selection of the merchant and dialing of the customer service merchant number, e.g., while the customer navigates an IVR menu or in response to selection of an IVR menu option, but before a live discussion between the customer and the CSA. Moreover, as another example, and as described above, different password handshake sequences may be utilized for additional data security.

Accordingly, embodiments are intended to exemplify alternatives, modifications, and equivalents that may fall within the scope of the claims.

What is claimed is:

1. A computer-implemented method, comprising:
a mobile communication device, by an a mobile acquisition-access application executed by a processor of the mobile communication device, generating a user interface, wherein the user interface is presented to a customer through a display of the mobile communication device;
the mobile communication device, by the acquisition-access application, receiving customer data based on customer interaction with the user interface and storing the customer data in a data store of the mobile communication device;
the mobile communication device, by the acquisition-access application, initiating a communication request through a network, the communication request comprising a request by the customer to communicate with a computer of the customer service agent;
the mobile communication device, by the acquisition-access application, presenting the customer with an interactive voice response menu of the customer service agent computer;
the mobile communication device, by the acquisition-access application, receiving customer input comprising selection of a menu option of the interactive voice response menu;
in response to selection of a pre-determined menu option, the mobile communication device, by the acquisition-access application, providing the customer service agent computer with access to the customer data stored in the data store of the mobile communication device; and the mobile communication device receiving request to access stored customer data from the customer service agent computer before the customer and the customer service agent are connected for a live discussion, wherein the customer and the customer service agent engage in a live discussion with each other through the mobile communication device and the customer service agent computer after the customer service agent computer is provided access to the customer data stored by the mobile communication device.

2. The computer-implemented method of claim 1, the communication request comprising customer identification data, wherein the customer data stored in the data store is associated with the customer identification data.

3. The computer-implemented method of claim 2, the customer identification data comprising a telephone number utilized to initiate the communication request.

4. The computer-implemented method of claim 2, the customer identification data comprising an electronic mail address utilized by the customer to contact the customer service agent.

5. The computer-implemented method of claim 2, the customer identification data comprising an Internet Protocol address of the mobile communication device utilized during an on-line communication with the customer service agent computer.

6. The computer-implemented method of claim 1, the merchant being a merchant at which the customer has an account.

7. The computer-implemented method of claim 1, the mobile communication device receiving customer data manually entered into the mobile communication device.

8. The computer-implemented method of claim 1, the mobile communication device receiving the customer data by acquisition of the customer data utilizing an image acquisition element of the mobile communication device.

9. The computer-implemented method of claim 1, wherein the mobile communication device, by the acquisition-access application, provides the customer service agent computer access to the customer data stored in the data store during navigation by the customer of the interactive call menu.

10. The computer-implemented method of claim 1, wherein the mobile communication device, by the acquisition-access application, provides the customer service agent computer with restricted access to the customer data stored in the data store of the mobile communication device.

11. The computer-implemented method of claim 10, the restricted access comprising read only access to the customer data stored in the data store of the mobile communication device.

12. The computer-implemented method of claim 10, the restricted access comprising temporary access to the customer data stored in the data store of the mobile communication device.

13. The computer-implemented method of claim 1, further comprising the mobile communication device, by the acquisition-access application, storing customer input related to the customer data, the mobile communication device, by the acquisition-access application, providing the customer service agent computer with access to the customer data and the customer input in response to the request to access stored customer data from the customer service agent computer before the customer and the customer service agent are connected for a live discussion.

14. The computer-implemented method of claim 13, the customer input related to the customer data specifying why the customer is calling the customer service agent.

15. The computer-implemented method of claim 1, the customer data comprising an account number.

16. The computer-implemented method of claim 1, the customer data comprising customer authentication data.

17. The computer-implemented method of claim 16, the authentication data comprising an image of, or data determined from, an identification document of the customer.

18. The method of claim 17, the identification document comprising a driver's license.

19. The method of claim 17, the identification document comprising a social security card.

20. The computer-implemented method of claim 17, the authentication data comprising a photograph or voice sample of the customer.

* * * * *